US006954007B1

(12) United States Patent
Meier et al.

(10) Patent No.: US 6,954,007 B1
(45) Date of Patent: Oct. 11, 2005

(54) METHOD AND DEVICE FOR CONTROLLING ENTRY INTO A SECURED LOCATION, ESPECIALLY INTO A MOTOR VEHICLE

(75) Inventors: Michael Meier, Hildesheim (DE); Stephan Schmitz, Cologne (DE); Andreas Titze, Braunschweig (DE); Dominique Nemetschek, Braunschweig (DE)

(73) Assignees: Volkswagen AG, Wolfsburg (DE); Robert Bosch GmbH, Stuttgart (DE)

( * ) Notice: Subject to any disclaimer, the term of this patent is extended or adjusted under 35 U.S.C. 154(b) by 385 days.

(21) Appl. No.: 10/110,825

(22) PCT Filed: Sep. 22, 2000

(86) PCT No.: PCT/EP00/09276

§ 371 (c)(1),
(2), (4) Date: Jul. 29, 2002

(87) PCT Pub. No.: WO01/29352

PCT Pub. Date: Apr. 26, 2001

(30) Foreign Application Priority Data

Oct. 16, 1999 (DE) ................................ 199 49 970

(51) Int. Cl.[7] ................................................ B60R 25/00
(52) U.S. Cl. .................... 307/10.2; 307/10.5; 180/287; 340/435
(58) Field of Search .............................. 307/10.2, 10.5; 180/287; 340/435

(56) References Cited

U.S. PATENT DOCUMENTS

| | | | | |
|---|---|---|---|---|
| 5,355,513 | A * | 10/1994 | Clarke et al. | 455/20 |
| 5,883,443 | A | 3/1999 | Wilson | |
| 5,983,347 | A * | 11/1999 | Brinkmeyer et al. | 340/5.62 |
| 6,323,566 | B1 * | 11/2001 | Meier | 307/10.2 |

FOREIGN PATENT DOCUMENTS

| | | |
|---|---|---|
| DE | 40 03 280 | 8/1991 |
| DE | 40 20 445 | 1/1992 |

(Continued)

*Primary Examiner*—Robert L. DeBeradinis
(74) *Attorney, Agent, or Firm*—Kenyon & Kenyon

(57) ABSTRACT

A method is for controlling entry, e.g., into a motor vehicle, during which a key and a base station wirelessly exchange authentication data between one another in an active or a passive communication mode. At the beginning of the authentication process, the base station transmits a call signal to the key, and the key replies to the call signal with a reply signal. The base station verifies the received reply signal of the key in the communications mode in which the reply signal was received. If the reply signal of the key was received in the active communications mode, the base station transmits a first selection instruction to the key thus causing the key to perform the subsequent communication in the active communications mode. If the reply signal of the key was received in the passive communications mode, the base station transmits a second selection instruction to the key thus causing the electronic key to perform the subsequent communication in the passive communications mode.

20 Claims, 1 Drawing Sheet

FOREIGN PATENT DOCUMENTS

| | | |
|---|---|---|
| DE | 42 26 053 | 2/1993 |
| DE | 43 29 697 | 3/1995 |
| DE | 44 09 167 | 6/1995 |
| DE | 44 40 855 | 5/1996 |
| DE | 195 39 851 | 6/1997 |
| DE | 196 32 025 | 4/1998 |
| DE | 198 02 526 | 7/1999 |
| DE | 198 36 957 | 9/1999 |
| DE | 198 18 158 | 10/1999 |
| EP | 0 659 963 | 6/1995 |
| EP | 0 848 123 | 6/1998 |
| WO | WO 00/05696 | 2/2000 |

* cited by examiner

METHOD AND DEVICE FOR CONTROLLING ENTRY INTO A SECURED LOCATION, ESPECIALLY INTO A MOTOR VEHICLE

FIELD OF THE INVENTION

The present invention relates to a method and a device for controlling access to a secured location, in particular to a motor vehicle, in which an electronic key and a base station wirelessly exchange authentication data between one another in an active or passive communication mode. At the beginning of this authentication process, the base station transmits a call signal to the electronic key to which it responds with a reply signal, a safety procedure against extending the radio link being implemented in the active communication mode. The invention also relates to a device for implementing the method.

BACKGROUND INFORMATION

A method and a device are described in International Published Patent Application No. WO 00/05696, in which the safety procedure implemented between the electronic key and the base station is executed in such a way that the communication between the electronic key and the base station is performed in the active operating mode via UHF-frequencies, the range of the transmission between the electronic key and the base station being limited in order to ensure that the communication link is interrupted when the person holding the key moves out of the immediate vicinity of the secured location, for example, the motor vehicle.

In order to prevent such a passive access control system from being inactivated by an unauthorized attacker intercepting the call signal transmitted by the base station to the electronic key, forwarding the intercepted signal via a radio link extension to a second attacker who is in the vicinity of the electronic key, and the second attacker retransmitting to the first attacker via the radio link extension the reply signal of the electronic key in response to the call signal of the base station and sending it via this attacker back to the base station, in the conventional method, the electronic key transmits a signal to the base station, which is then converted by the base station into spectral data. The base station will grant access to the secured location only if these spectral data in the transmission of the authentication data match a spectral signature of the electronic key that is stored in the base station. In this context, the signal transmitted by the electronic key includes at least two tones of different frequencies $f_1$ and $f_2$, respectively, and the spectral data represent tones of the third order of the transmitted signal, which are measured by the base station at the frequencies $2f_1-f_2$ and $2f_2-f_1$. If the received signal strength of these secondary lines of the signal transmitted by the electronic key exceeds a predefined value, the base station interprets this as a reliable indication that the radio link has been extended, and refuses access to the secured location.

In order to still allow the user to enter the secured location when the active communication mode is inoperative, within the framework of a so-called back-up mode, i.e., a passive communication mode, it is provided that in this passive communication mode, a data transmission between the electronic key and the base station be performed by a passive modulation of the exciter field transmitted by the base station. The electronic key detunes its resonance circuit in correspondence with the data to be transmitted, which may be detected by the base station as an additional load on its resonant circuit. This passive communication conducted on LF-frequencies is limited to a few centimeters, which means that a potential attacker, when attempting to send the data signals transmitted by the key to the base station on an LF-frequency in back-up mode, must place his respective antenna very close to the transmitting antenna of the base station in order to operate in this back-up mode. The conventional methods and the conventional devices working according to these methods have the disadvantage of not providing effective protection against an attack performed in the aforementioned manner.

Therefore, it is an object of the present invention to provide a method and a device that provides effective protection against a radio link extension in the passive communication mode.

SUMMARY

This objective is achieved by providing the method according to the present invention, by the base station ascertaining in which communication mode the reply signal transmitted to it by the electronic key has been received. If the reply signal of the electronic key has been received in the active communication mode, the base station sends a first selection instruction to the electronic key, which causes the electronic key to perform the subsequent communication in the active communication mode. If the reply signal of the electronic key has been received in the passive communication mode, the base station sends a second selection instruction to the electronic key, causing it to perform the subsequent communication in the passive communication mode.

The method according to the present invention may assure that a particular attack by an unauthorized person may be prevented even in the passive communication mode between the electronic key and the base station, by the base station actively reacting to the communication type in which it receives the reply signal from the electronic key. If the reply signal is generated in the active communication mode, the further authentication procedure is performed in the active communication mode, and a radio link extension may be excluded by the safety procedure. However, if the base station receives the reply signal from the electronic key in the passive communication mode, it may prevent a communication between the base station and the key via the first, active communication mode until the access procedure has been concluded. Thus, an attacker is unable to perform a radio link extension via a frequency of the active communication mode.

Further developments of the invention are described below.

Further details and advantages of the present invention may be gathered from the example embodiment, which is described below with reference to the single FIGURE.

DETAILED DESCRIPTION

Figure 1:
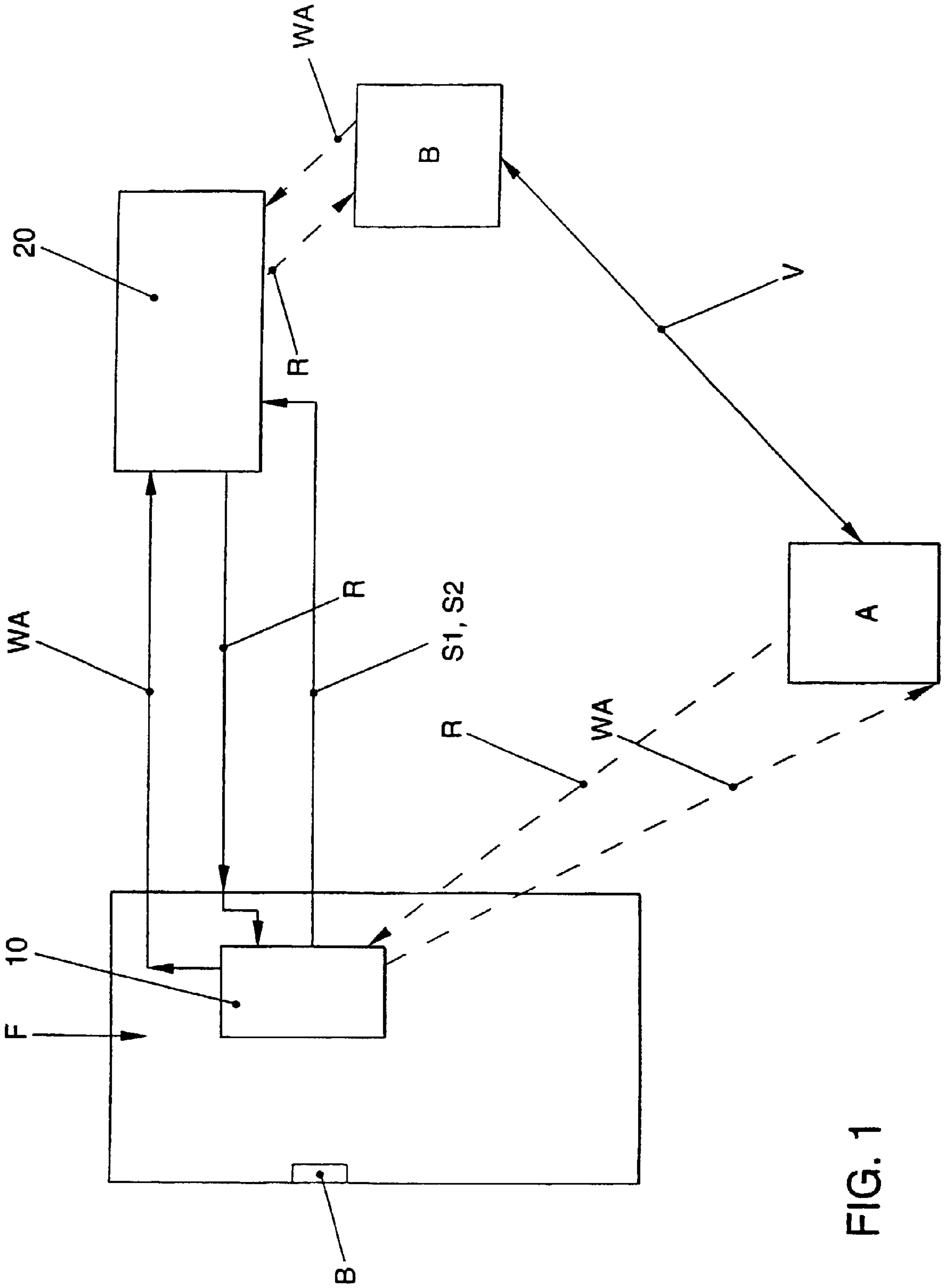
FIG. 1 is a schematic view of an example embodiment illustrating a method according to the present invention.

In FIG. 1, the typical constellation is illustrated, which represents the starting point of the method for controlling access to a secured location, in this case to a motor vehicle F, as described below. Located in motor vehicle F is a base station 10, which wirelessly exchanges authentication data with an electronic key 20, for the purpose of ensuring that only the owner of electronic key 20 will gain access to the secured location. For that purpose, base station 10 transmits a call signal WA for electronic key 20 in an active, first communication mode whenever an actuating element B, e.g., a door handle, is activated on motor vehicle F. Electronic key 20 thereupon replies in the active communication mode by an appropriate reply signal R, thus implementing a communication connection between electronic key 20 and base station 10, which is to be performed in the active communication mode. The data transmitted between electronic key 20 and base station 10 are determined by a generally conventional communication protocol, which electronic key 20 and base station 10 comply with, and which incorporates the transmission of authentication data from electronic key 20 to base station 10. Base station 10 will grant access to secured motor vehicle F only if the authentication data transmitted by electronic key 20 match the authentications stored by base station 10. In this context, the signals transmitted by electronic key 20 and/or by base station 10 have only a limited transmission range, in order to prevent base station 10 from allowing access to secured motor vehicle F even when electronic key 20 is not within a defined vicinity of motor vehicle F, typically a few meters.

In order to prevent that attackers gain access to motor vehicle F by a first attacker A1 conveying call signal WA, transmitted by base station 10 in the first, active communication mode, to a second attacker A2 by extending the radio link V, and second attacker A2 thereupon conveying call signal WA of base station 10 to electronic key 20, which is outside of the transmission range of base station 10, intercepting reply signal R of electronic key 20 and forwarding it to first attacker A1 via radio link extension V, and attacker A1 then forwarding reply signal R of electronic key 20 to base station 10, the communication occurring between electronic key 20 and base station 10 in the first, active communication mode also includes a safety procedure, which allows detection of such a radio link extension V of corresponding signals WA, R and, if appropriate, breaking off the communication as a result. Such a safety procedure is described, for example, in International Published Patent Application No. WO 00/05696, which is expressly incorporated herein in its entirety by reference thereto. In this case, the safety procedure is implemented by electronic key 20 transmitting an identifying signal within the framework of reply signal R, generated in response to call signal WA of base station 10, which base station 10 converts into spectral data. Base station 10 continues the communication with electronic key 20 only if the spectral data it receives match the spectral signature of electronic key 20 stored in base station 10. In particular, in this context, electronic key 20 transmits two tones having the frequency $f_1$ and $f_2$, respectively, which are subsequently detected by base station 10. However, apart from the two tones $f_1$ and $f_2$, other mixtures of the two basic higher order-tones are also received, in frequency channels that are separated in their frequencies from the basic tones. If the received signal strength, in particular that of the secondary lines of the third order, exceeds a predefined value, this is a reliable indication that the received signal from electronic key 20 was sent over a radio link extension. In this case, base station 10 breaks off communication with electronic key 20 and blocks access to secured motor vehicle F.

However, since it is normally provided that electronic key 20 and base station 10 may be able to communicate with one another in the previously described active communication mode and also in the so-called back-up mode in a second, passive communication mode, it may be necessary, even in this passive communications mode in which the safety procedure of the active communications mode does not function, to provide an additional safety procedure for just that passive communication mode.

This may be achieved by base station 10 not only analyzing the information content of the signals transmitted to it, in particular of reply signal R of key 20, but also determining whether the signals of electronic key 20 conveyed to it are received in the first, active communication mode or in the second, passive communication mode. If base station 10 receives reply signal R, which electronic key 20 generated in response to a call instruction WA that base station 10 transmitted, in the first, active communication mode, it sends to electronic key 20 a first selection signal S1 as a reaction to reply signal R of electronic key 20 received in the active communication mode, which—in addition to the usual functions of a selection signal—has the effect that at least the safety-relevant, and, e.g., the entire further communication between electronic key 20 and base station 10 is exclusively performed in the first, active communication mode, and that the implementation of the remaining authentication process in the passive communication mode is prevented. This may provide the advantage that a radio link extension V is detectable by the safety procedure of the active communication mode and, if necessary, appropriate measures may be taken against an attack by an unauthorized person.

However, if base station 10 of motor vehicle F receives reply signal R of electronic key 20 in the second, passive communication mode, it transmits a second selection signal S2 to electronic key 20 in response thereto, which appropriately causes the communication of the further authentication process to be performed in the second, passive communication mode. The implementation of the remaining authentication process in the first communication mode is prevented. In this manner, an attacker using a radio link extension V operating in the active communication mode is no longer able to use it successfully.

What is claimed is:

1. A method for controlling access to a secured location, in which an electronic key and a base station wirelessly exchange authentication data between one another in one of an active communication mode and a passive communication mode, comprising the steps of:

transmitting a call signal by the base station to the electronic key at a beginning of an authentication procedure;

responding to the call signal by the electronic key with a reply signal;

implementing a safety procedure against a radio link extension in the active communication mode;

analyzing the reply signal of the electronic key received by the base station to ascertain in which communication mode the reply signal has been received;

transmitting a first selection instruction by the base station to the electronic key if the reply signal from the electronic key has been received in the active communication mode to cause the electronic key to conduct subsequent communication in the active communication mode; and transmitting a second selection instruction by the base station to the electronic key if the reply signal from the electronic key has been received in the passive communication mode to cause the electronic key to conduct subsequent communication in the passive communication mode.

2. The method according to claim 1, wherein the secured location includes a motor vehicle.

3. The method according to claim 2, wherein the call signal is transmitted in response to an activation of an actuating element on the motor vehicle.

4. The method according to claim 3, wherein the actuating element is a door handle.

5. The method according to claim 1, wherein the safety procedure implementing step includes the substeps of:

generating an identifier by the electronic key in response to the call signal of the base station;

transmitting the identifier by the electronic key to the base station with the reply signal;

converting the identifier by the base station into spectral data; and continuing communication by the base station with the electronic key only if the spectral data match a spectral signature of the electronic key stored in the base station.

6. The method according to claim 1, further comprising the step of implementing a safety-relevant communication of the authentication procedure by the electronic key after the key receives one of the first selection instruction and the second selection instruction and in the communication mode corresponding to the received one of the first selection instruction and the second selection instruction.

7. The method according to claim 1, further comprising the step of implementing at least one entire subsequent authentication process by the electronic key after the electronic key receives one of the first selection instruction and the second selection instruction and in the communication mode corresponding to the received one of the first selection instruction and the second selection instruction.

8. A device for controlling access to a secured location, comprising:

an electronic key including an arrangement configured to exchange authentication data in one of an active communication mode and a passive communication mode; and a base station including:

an arrangement configured to exchange authentication data in one of an active communication mode and a passive communication mode;

an arrangement configured to implement a safety procedure against extending a radio link in the active communication mode;

an arrangement configured to analyze a received reply signal from the electronic key with regard to the communication mode;

an arrangement configured to generate a first selection instruction and to transmit the first selection instruction to the electronic key so that if the base station receives a reply signal from the electronic key in the active communication mode, the electronic key performs subsequent communication with the base station in the active communication mode in accordance with the first selection instruction received; and an arrangement configured to generate a second selection instruction and to transmit the second selection instruction to the electronic key so that if the base station receives the reply signal from the electronic key in the passive communication mode, the electronic key performs subsequent communication with the base station in the passive communication mode.

9. The device according to claim 8, wherein the secured location includes a motor vehicle.

10. The device according to claim 9, wherein the base station is configured to transmit a call signal to the electronic key in response to an activation of an actuating element on the motor vehicle, and wherein the electronic key is configured to transmit the reply signal to the base station in response to the call signal.

11. The device according to claim 10, wherein the actuating element is a door handle.

12. The device according to claim 8, wherein the safety procedure includes:

a conversion into spectral data of an identifier transmitted to the base station by the electronic key; and a continuance of communication by the base station with the electronic key only if the spectral data match a spectral signature of the electronic key stored in the base station.

13. The device according to claim 8, wherein the electronic key is configured to implement a safety-relevant communication after the key receives one of the first and the second selection instruction and in the communication mode corresponding to the received one of the first selection instruction and the second selection instruction.

14. The device according to claim 8, wherein the electronic key is configured to implement at least one entire subsequent authentication procedure after the electronic key receives one of the first selection instruction and the second selection instruction and in the communication mode corresponding to the received one of the first selection instruction and the second selection instruction.

15. A device for controlling access to a secured location, comprising:

a base station; and an electronic key;

wherein the base station and the electronic key include means for exchanging authentication data in one of an active communication mode and a passive communication mode; and wherein the base station includes:

means for implementing a safety procedure against extending a radio link in the active communication mode;

means for analyzing a received reply signal from the electronic key with regard to the communication mode;

means for generating a first selection instruction and for transmitting the first selection instruction to the electronic key so that if the base station receives the reply signal from the electronic key in the active communication mode, the electronic key performs subsequent communication with the base station in the active communication mode in accordance with the first selection instruction received; and means for generating a second selection instruction and for transmitting the second selection instruction to the electronic key so that if the base station receives the reply signal from the electronic key in the passive communication mode, the electronic key performs subsequent communication with the base station in the passive communication mode.

16. The device according to claim 15, wherein the secured location includes a motor vehicle.

17. The device according to claim 16, wherein the base station includes means for transmitting a call signal to the electronic key in response to an activation of an actuating element on the motor vehicle, and wherein the electronic key includes means for transmitting the reply signal to the base station in response to the call signal.

18. The device according to claim 15, wherein the safety procedure includes:

a conversion into spectral data of an identifier transmitted to the base station by the electronic key; and a continuance of communication by the base station with the electronic key only if the spectral data match a spectral signature of the electronic key stored in the base station.

19. The device according to claim 15, wherein the electronic key includes means for implementing a safety-relevant communication after the key receives one of the first and the second selection instruction and in the communication mode corresponding to the received one of the first selection instruction and the second selection instruction.

20. The device according to claim 15, wherein the electronic key includes means for implementing at least one entire subsequent authentication procedure after the electronic key receives one of the first selection instruction and the second selection instruction and in the communication mode corresponding to the received one of the first selection instruction and the second selection instruction.

* * * * *